(12) United States Patent
Wennerberg et al.

(10) Patent No.: US 8,830,118 B2
(45) Date of Patent: Sep. 9, 2014

(54) RADAR LEVEL GAUGE SYSTEM WITH OPERATION MONITORING FUNCTIONALITY

(75) Inventors: Tomas Wennerberg, Kållered (SE); Marcus Grahn, Linköping (SE)

(73) Assignee: Rosemount Tank Radar AB, Gothenburg (SE)

( * ) Notice: Subject to any disclaimer, the term of this patent is extended or adjusted under 35 U.S.C. 154(b) by 186 days.

(21) Appl. No.: 12/876,569

(22) Filed: Sep. 7, 2010

(65) Prior Publication Data

US 2012/0056774 A1    Mar. 8, 2012

(51) Int. Cl.
| | |
|---|---|
| *G01S 13/08* | (2006.01) |
| *G01S 13/10* | (2006.01) |
| *G01F 25/00* | (2006.01) |
| *G01S 7/292* | (2006.01) |
| *G01F 23/284* | (2006.01) |
| *G01S 7/40* | (2006.01) |
| *G01S 13/88* | (2006.01) |

(52) U.S. Cl.
CPC ............... *G01S 7/292* (2013.01); *G01S 13/10* (2013.01); *G01F 25/0061* (2013.01); *G01S 2007/4091* (2013.01); *G01S 13/88* (2013.01); *G01S 7/4052* (2013.01); *G01F 23/284* (2013.01)
USPC .......................................... 342/124; 342/118

(58) Field of Classification Search
CPC ... G01F 23/284; G01F 25/0061; G01S 13/88; G01S 13/08; H01Q 1/225
USPC ........................................................ 342/124
See application file for complete search history.

(56) References Cited

U.S. PATENT DOCUMENTS 5,649,450 A  *  7/1997  Glab et al. ....................... 73/307
6,295,018 B1     9/2001  Diede et al.

(Continued)

FOREIGN PATENT DOCUMENTS

| EP | 1 906 158 | 4/2008 |
|---|---|---|
| EP | 2 199 763 | 6/2010 |
| WO | WO 2008/066457 | 6/2008 |
| WO | WO 2009/134202 | 11/2009 |

OTHER PUBLICATIONS

International Search Report for PCT Application No. PCT/EP2011/065172, dated Jan. 13, 2012, 4 pages.

(Continued)

*Primary Examiner* — John B Sotomayor
*Assistant Examiner* — Marcus Windrich
(74) *Attorney, Agent, or Firm* — Westman, Champlin & Koehler, P.A.

(57) ABSTRACT

A method of monitoring operation of a radar level gauge system installed at a tank and arranged to determine a filling level of a product contained in the tank. The method comprises the steps of: providing a first propagation property discontinuity at a first distance from a reference position at a top of the tank; generating and transmitting an electromagnetic signal; propagating the transmitted electromagnetic signal towards the product contained in the tank; receiving a reflected electromagnetic signal comprising a plurality of echoes resulting from reflections at propagation property discontinuities encountered by the transmitted electromagnetic signal, including a first reference echo resulting from reflection at the first propagation property discontinuity and a surface echo resulting from reflection at a surface of the product contained in the tank; identifying the surface echo; determining the filling level based on the surface echo; evaluating a first portion of the reflected electromagnetic signal exhibiting a time-of-flight corresponding to the first distance from the reference position; determining, based on the evaluation, whether or not the first reference echo is detectable in the first portion of the reflected electromagnetic signal. If it is determined that the first reference echo is detectable in the first portion of the reflected electromagnetic signal, a first signal indicative of the filling level is provided; and if it is determined that the first reference echo is non-detectable in the first portion of the reflected electromagnetic signal, a second signal different from the first signal is provided.

13 Claims, 4 Drawing Sheets

(56) References Cited

U.S. PATENT DOCUMENTS

| | | | |
|---|---|---|---|
| 6,795,015 B2 | 9/2004 | Edvardsson | 342/124 |
| 7,319,401 B2* | 1/2008 | Åkerstrom et al. | 340/612 |
| 7,525,476 B1* | 4/2009 | Delin et al. | 342/124 |
| 2005/0285777 A1* | 12/2005 | Karlsson | 342/124 |
| 2007/0046528 A1* | 3/2007 | Larsson et al. | 342/124 |
| 2008/0060431 A1* | 3/2008 | Frovik | 73/290 V |
| 2008/0297403 A1* | 12/2008 | Akerstrom et al. | 342/175 |
| 2009/0033543 A1* | 2/2009 | Nilsson et al. | 342/124 |
| 2009/0273506 A1* | 11/2009 | Delin | 342/124 |
| 2010/0156702 A1* | 6/2010 | Edvardsson | 342/124 |
| 2010/0207807 A1 | 8/2010 | Kuhlow et al. | 342/124 |
| 2010/0231438 A1* | 9/2010 | Ohlsson et al. | 342/124 |

OTHER PUBLICATIONS

Written Opinion from International Search Report for PCT Application No. PCT/EP2011/065172, dated Jan. 13, 2012, 4 pages.

* cited by examiner

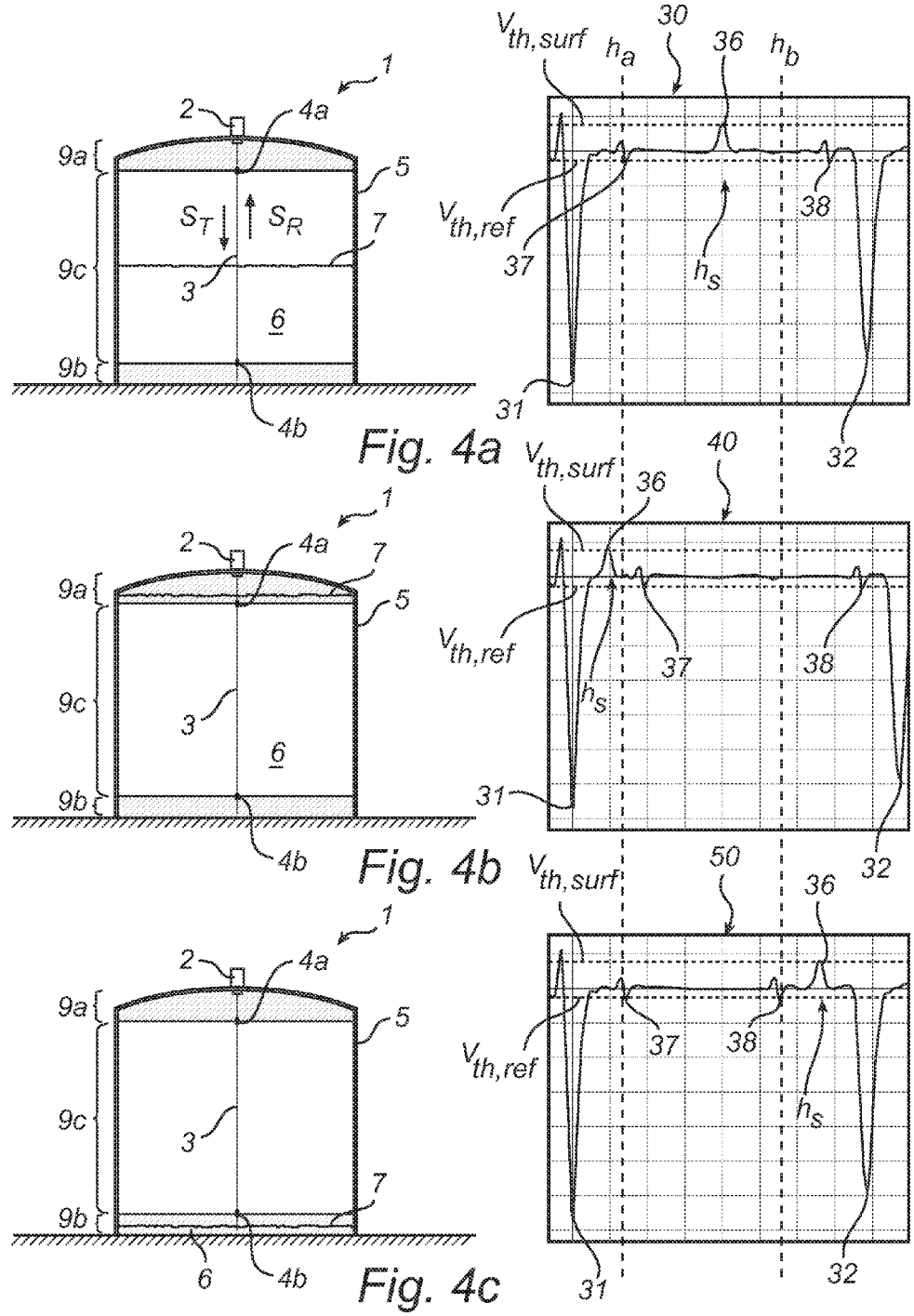

RADAR LEVEL GAUGE SYSTEM WITH OPERATION MONITORING FUNCTIONALITY

TECHNICAL FIELD OF THE INVENTION

The present invention relates to a method and device for monitoring operation of a radar level gauge system, for determination of a filling level of a product contained in a tank. The present invention further relates to a radar level gauge system with operation monitoring functionality.

TECHNICAL BACKGROUND

Radar level gauge systems are in wide use for measuring process variables of a product contained in a tank, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

More particularly, the distance to the surface of the product is generally determined based on the time between transmission of an electromagnetic signal and receipt of the reflection thereof in the interface between the atmosphere in the tank and the product contained therein. In order to determine the actual filling level of the product, the distance from a reference position to the surface is determined based on the above-mentioned time (the so-called time-of-flight) and the propagation velocity along the probe of the electromagnetic signals.

In some applications of radar level gauge systems and other systems for determining the filling level of a product in a tank, it is important to be able to securely tell if the filling level has reached a certain critical level (high or low) or if the filling level is in the normal filling level range. For example, it may be required that a system is provided for issuing a signal to indicate when the filling level exceeds a preset limit to safely be able to prevent an overfill condition.

Systems producing alarms are conventionally realized as mechanical systems including a float member which is mechanically connected to a detector. An example of such a system is disclosed in U.S. Pat. No. 5,649,450. However, such mechanical systems are the subject of many problems. For example, the environment in the tanks is often relatively rough, making the movable mechanical parts likely to malfunction over time. Further, the floating member needs to be in contact with the fluid, which is disadvantageous since the surface is normally not calm in use. Accordingly, these mechanical systems have problems with robustness, accuracy and reliability.

To address the above problems associated with mechanical systems for providing an overfill alarm signal, U.S. Pat. No. 7,319,401 provides a system for continuously determining a filling level, and to produce an alarm signal if the filling level is determined to exceed a preset threshold value indicative of a high level and/or overfill condition.

However, the operator of the tank application may still, depending on the application and regulations and/or operator internal guidelines need to periodically perform proof tests to verify operation of the overfill alarm system. Such proof tests may require the operator to manually measure the filling level and to compare the manually measured filled level value with that given by the system according to U.S. Pat. No. 7,319,401.

Hence, although the system disclosed in U.S. Pat. No. 7,319,401 provides a considerably higher reliability than the previous mechanical overfill alarm systems, there may still be room for improvement in order to further reduce the time and effort spent on proof testing of the overfill alarm system.

SUMMARY OF THE INVENTION

In view of the above-mentioned and other drawbacks of the prior art, a general object of the present invention is to provide an improved method and system for monitoring a radar level gauge system, and to facilitating proof testing of such a system for monitoring a radar level gauge system.

According to a first aspect of the present invention, these and other objects are achieved through a method of monitoring operation of a radar level gauge system installed at a tank and arranged to determine a filling level of a product contained in the tank, comprising the steps of: providing a probe extending into the product contained in the tank; providing, along the probe, a first propagation property discontinuity at a first distance from a reference position at a top of the tank; generating and transmitting an electromagnetic signal; guiding the transmitted electromagnetic signal along the probe towards and into the product contained in the tank; receiving a reflected electromagnetic signal comprising a plurality of echoes resulting from reflections at propagation property discontinuities encountered by the transmitted electromagnetic signal, including a first reference echo resulting from reflection at the first propagation property discontinuity and a surface echo resulting from reflection at a surface of the product contained in the tank; evaluating a first portion of the reflected electromagnetic signal exhibiting a time-of-flight corresponding to the first distance from the reference position; determining, based on the evaluation, whether or not the first reference echo is detectable in the first portion of the reflected electromagnetic signal; if it is determined that the first reference echo is detectable in the first portion of the reflected electromagnetic signal, providing a first signal; and if it is determined that the first reference echo is non-detectable in the first portion of the reflected electromagnetic signal, providing a second signal different from the first signal.

It should be noted that the method according to the present invention is by no means limited to performing the steps thereof in any particular order.

The tank may be any container or vessel capable of containing a product, and may be metallic, or partly or completely non-metallic, open, semi-open, or closed.

In the context of the present application, a "propagation property discontinuity" should be understood as a discontinuity in any property influencing the propagation of the transmitted electromagnetic signal. Such properties include, for example, impedance, permittivity, conductivity etc.

The typical range of levels across which the filling level fluctuates during normal use is, as is well known for those of ordinary skill in the art, from about 10% to about 90% of the total height of the tank.

Moreover, the above-mentioned first portion of the reflected electromagnetic signal may be directly evaluated, or a measurement signal may be formed based on the reflected signal and the transmitted signal, or a reference signal that is related to the transmitted signal.

Additionally, the entire reflected electromagnetic signal and/or a measurement signal formed using the reflected electromagnetic signal may be evaluated.

In radar level gauge systems, the distance from a reference position at the top of the tank to the surface of the product contained in the tank is determined based on the time-of-flight of the electromagnetic signal reflected by the surface and the propagation properties inside the tank above the surface of the product. From this distance, the filling level can be determined.

The present invention is based on the realization that the time-of-flight of the electromagnetic signal reflected by a propagation property discontinuity arranged at a given position (or a position determined through measurement by the radar level gauge system itself in undisturbed conditions) inside the tank will vary depending on whether or not the propagation property discontinuity, such as a reference reflector, is covered by the product or not. Since the propagation velocity in the product is lower than in the atmosphere above the surface of the product, the time-of-flight of the electromagnetic signal to the propagation property discontinuity (and back) will be longer when the propagation property discontinuity is covered by the product than when the propagation property discontinuity is not covered by the product.

The present inventors have further realized that this effect can be used to reliably indicate if the surface of the product in the tank is above or below the position of the propagation property discontinuity.

By verifying the position of the reference propagation property discontinuity, the ability of the operation monitoring device to measure at all, as well as the quality of measurement can be verified, which will make it possible for the tank operator to avoid unnecessary manual intervention. The first signal will indicate to the operator that the surface level is below the position of the first propagation property discontinuity, and the second signal will indicate to the operator that the surface level is at or above the first propagation property discontinuity.

Advantageously, the steps of the method according to the present aspect of the invention may be carried out continuously, that is, with a repetition frequency in the range of 0.1 Hz or higher. This will allow continuous monitoring of the conditions in the tank and of the operation of the radar level gauge system arranged to determine the filling level.

The step of evaluating may advantageously comprise the steps of: acquiring a candidate signal property set based on the first portion of the reflected electromagnetic signal; and comparing the candidate signal property set with a stored signal property set indicative of the first reference echo.

Hereby, the selectivity of the detection can be made practically fool proof, since it is extremely unlikely that a spurious reflection would occur that would appear to be at the same level and have a sufficiently similar signal property set as the first propagation property discontinuity.

To even further reduce this risk, the first propagation property discontinuity may advantageously be designed to result in an easily distinguishable signal property set, such as with an opposite sign as compared to the signal properties of the reflection from the surface of the product, or with a positive portion and a negative portion.

According to various embodiments, the method according to the present invention may advantageously further comprise the steps of: identifying the surface echo; and determining the filling level based on the surface echo.

In these embodiments, the first signal that is provided if it is determined that the first reference echo is detectable, may be indicative of the filling level. Thereby, the filling level can be continuously monitored so that the operator can get an indication of the margin left between the current filling level and the position of the first propagation property discontinuity. If the first signal is indicative of the filling level, the operator will, furthermore, be able to verify that measures that are taken to, for example, lower the filling level are effective.

In some applications, such as in various process vessels and/or boilers, the vapor concentration etc above the surface of the product contained in the tank may vary considerably over time. Under such conditions, the time-of-flight corresponding to the first distance from the reference position at the top of the tank may vary even when the first reference propagation property discontinuity is above the surface of the product contained in the tank.

To enable reliable detection of the first reference propagation property discontinuity under such conditions, the method according to the present invention may further comprise the steps of providing, along the probe, a second propagation property discontinuity at a known distance from the first propagation property discontinuity; determining an electrical distance between the first propagation property discontinuity and the second propagation property discontinuity based on the reflected electromagnetic signal; and determining a vapor compensated time-of-flight corresponding to the first distance from the reference position at the top of the tank based on the known distance and the electrical distance, wherein a vapor compensated portion of the reflected electromagnetic signal exhibiting the vapor compensated time-of-flight is evaluated.

According to one embodiment, the first propagation property discontinuity may be arranged to define an overfill detection zone above a normal filling level range for the tank. Hereby, a potentially harmful overfill condition can be reliably detected.

According to another embodiment, the first reference propagation property discontinuity may be arranged to define a depletion zone close to a bottom of the tank. In various applications, such as in the process industry, it would be undesirable to allow the tank to "run dry" unintentionally, since this may lead to damages to pumps and/or other equipment. By arranging the first reference propagation property discontinuity to define the above-mentioned depletion zone, a dry run condition can be reliably determined.

Alternatively, the first reference propagation property discontinuity may be arranged to define the above-mentioned overfill detection zone, and a further propagation property discontinuity may be arranged to define the above-mentioned depletion zone, allowing simultaneous monitoring of overfill and depletion conditions in the tank.

According to a second aspect of the present invention, the above-mentioned and other objects are achieved by a method of monitoring operation of a radar level gauge system installed at a tank and arranged to determine a filling level of a product contained in the tank, comprising the steps of: providing a first propagation property discontinuity at a first known distance from a reference position at a top of the tank; generating and transmitting an electromagnetic signal; propagating the transmitted electromagnetic signal towards the product contained in the tank; receiving a reflected electromagnetic signal comprising a plurality of echoes resulting from reflections at propagation property discontinuities encountered by the transmitted electromagnetic signal, including a first reference echo resulting from reflection at the first propagation property discontinuity and a surface echo resulting from reflection at a surface of the product contained in the tank; identifying the surface echo; determining the filling level based on the surface echo; evaluating a first portion of the reflected electromagnetic signal exhibiting a time-of-flight corresponding to the first distance from the reference position; determining, based on the evaluation, whether or not the first reference echo is detectable in the first portion of the reflected electromagnetic signal; if it is determined that the first reference echo is detectable in the first portion of the reflected electromagnetic signal, providing a first signal indicative of the filling level; and if it is determined that the first reference echo is non-detectable in the first portion of the reflected electromagnetic signal, providing a second signal different from the first signal.

Embodiments of, and effects obtained through this second aspect of the present invention are largely analogous to those described above for the first aspect of the invention.

According to a third aspect of the present invention, the above-mentioned and other objects are achieved by an operation monitoring device for monitoring operation of a radar level gauge system installed at a tank and arranged to determine a filling level of a product contained in the tank, the operation monitoring device comprising: a transceiver for generating, transmitting and receiving electromagnetic signals; a probe connected to the transceiver and arranged to guide a transmitted electromagnetic signal from the transceiver towards and into the product inside the tank, and to return a reflected electromagnetic signal resulting from reflections at propagation property discontinuities encountered by the transmitted electromagnetic signal, including a surface echo resulting from reflection at a surface of the product contained in the tank; at least a first propagation property discontinuity being arranged along the probe at a first known distance from a reference position at a top of the tank and being configured to reflect a portion of the transmitted electromagnetic signal back towards the transceiver to thereby provide a first reference echo; a signal evaluator for evaluating a first portion of the reflected electromagnetic signal exhibiting a time-of-flight corresponding to the first distance from the reference position; a determinator for determining, based on the evaluation, whether or not the first reference echo is detectable in the first portion of the reflected electromagnetic signal; and a signal generator for providing a first signal if it is determined that the first reference echo is detectable in the first portion of the reflected electromagnetic signal; and a second signal different from the first signal if it is determined that the first reference echo is non-detectable in the first portion of the reflected electromagnetic signal.

The "transceiver" may be one functional unit capable of transmitting and receiving electromagnetic signals, or may be a system comprising separate transmitter and receiver units.

One or several of the signal evaluator, the determinator and the signal generator may be provided as separate devices, or in a single device, and may be realized through hardware, software or a combination thereof.

In the context of the present application, the "probe" is a waveguide designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

The first propagation property discontinuity may be provided by a reference reflector arranged at the first known level along the probe.

Such a reference reflector may be implemented as a structure capable of reflecting electromagnetic signals traveling along the probe and may be achieved by means of a structure external to the probe, an internal structure in the probe, or a combination thereof. Furthermore, in the case of multiple reference reflectors, different reference reflectors may be provided as identical or different reflecting structures.

A reference reflector may advantageously comprise: an upper portion providing a first impedance transition to a higher impedance for the transmitted electromagnetic signal; and a lower portion providing a second impedance transition to a lower impedance for the transmitted electromagnetic signal, the upper and lower portions being separated along the probe by a distance selected such that an electromagnetic signal reflected by the first impedance transition and an electromagnetic signal reflected by the second impedance transition together form a composite reflected electromagnetic signal having a positive portion and a negative portion, thereby facilitating discrimination of received electromagnetic signals reflected by the reference reflectors.

A reflection of a transmitted electromagnetic signal having a certain polarity, such as a "positive" pulse, at a transition to a lower impedance will have the same polarity as the transmitted electromagnetic signal, and a reflection at a transition to a higher impedance will have opposite polarity. Electromagnetic signals reflected by such opposite impedance transitions, that are suitably spaced apart, will consequently result in a composite electromagnetic signal having portions of opposite polarity. This will make such signals easily distinguishable from a signal reflected by the surface of the product, since the surface typically provides a single isolated impedance transition (typically to a lower impedance).

A suitable distance between the upper and lower portions is related to the pulse time, and for a 1 ns pulse, a distance of about 100 mm will yield an easily distinguishable composite electromagnetic signal. It should, however, be understood that there is a range of distances around this exemplifying distance that will serve the same purpose.

The signal evaluator may advantageously comprise an acquisition unit for acquiring a candidate signal property set based on the first portion of the reflected electromagnetic signal; and a comparator for comparing the candidate signal property set with a stored signal property set indicative of the first reference echo.

The operation monitoring device according to the present invention may advantageously further comprise processing circuitry for identifying the surface echo, and determining the filling level based on the reflected electromagnetic signal.

Moreover, the first propagation property discontinuity may be provided by a movable reference reflector, which enables the operator of the tank to control the position of the first reference propagation property discontinuity.

Finally, according to a fourth aspect of the present invention, the above-mentioned and other objects are achieved by an operation monitoring device for monitoring operation of a radar level gauge system installed at a tank and arranged to determine a filling level of a product contained in the tank, the operation monitoring device comprising: a transceiver for generating, transmitting and receiving electromagnetic signals; a propagating device connected to the transceiver and arranged to propagate a transmitted electromagnetic signal from the transceiver towards and into the product inside the tank, and to return a reflected electromagnetic signal resulting from reflections at propagation property discontinuities encountered by the transmitted electromagnetic signal, including a surface echo resulting from reflection at a surface of the product contained in the tank; at least a first propagation property discontinuity being arranged at a first known distance from a reference position at a top of the tank and being configured to reflect a portion of the transmitted electromagnetic signal back towards the transceiver to thereby provide a first reference echo; a signal evaluator for evaluating a first portion of the reflected electromagnetic signal exhibiting a time-of-flight corresponding to the first distance from the reference position; a determinator for determining, based on the evaluation, whether or not the first reference echo is detectable in the first portion of the reflected electromagnetic signal; processing circuitry for identifying the surface echo, and determining the filling level based on the reflected electromagnetic signal; and a signal generator for providing a first signal indicative of the filling level if it is determined that the first reference echo is detectable in the first portion of the reflected electromagnetic signal; and a second signal different from the first signal if it is determined that the first reference echo is non-detectable in the first portion of the reflected electromagnetic signal.

The propagating device may comprise an antenna arranged to radiate the transmitted electromagnetic signal towards the product contained in the tank, and to receive the reflected signal.

In such embodiments, where the propagating device comprises a radiating antenna, the first propagation property discontinuity, and, where applicable, any other propagation property discontinuity may be provided in the form of a fixed structure installed at a known level inside the tank.

In relation to providing the first signal and the second signal, respectively, the following is relevant. For an analog output interface in the radar level gauge system, the filling level can be communicated as a current between 4 mA and 20 mA. An alarm condition, such as a high level alarm, a low level alarm, general alarm, a reference loss alarm, a reference found alarm, can be communicated with an alarm current, for instance 21.75 mA (a current outside the 4 to 20 mA range). Alternatively, an alarm condition, or an state of operation that is outside normal operation conditions, can be communicated by setting the current for the analog output to a current corresponding to a certain predefined filling level. As an example, a high level alarm can be communicated as 20 mA on the analog output. This would generally require that 20 mA is not included in a current range corresponding to normal operating conditions in a certain field application. In many field applications, there is provided a digital communication link. This will provide possibilities of communicating several indications for a present operational condition. For instance, an alarm and a determined filling level could be communicated independently of each other.

BRIEF DESCRIPTION OF THE DRAWINGS

These and other aspects of the present invention will now be described in more detail, with reference to the appended drawings showing a currently preferred embodiment of the invention, wherein:

FIG. 1b is a schematic illustration of the measurement electronics unit comprised in the operation monitoring device in FIG. 1a;

FIG. 2b schematically illustrates an echo signal obtained from reflection at the reference reflector in FIG. 2a;

FIGS. 4a-c schematically illustrate different exemplary operating conditions in a tank, with different filling levels, as well as exemplary echo profiles obtained by the operation monitoring device.

DETAILED DESCRIPTION OF AN EXAMPLE EMBODIMENT OF THE INVENTION

In the present detailed description, various embodiments of the radar level gauge system according to the present invention are mainly discussed with reference to a pulsed guided wave radar (GWR) level gauge system utilizing a single line probe. It should be noted that this by no means limits the scope of the present invention, which is equally applicable to GWR-systems being equipped with various other kinds of probes, such as two-lead probes, coaxial probes, etc.

Moreover, various aspects of the present invention are also applicable to non-contact type radar level gauge systems, in which an electromagnetic signal is propagated towards the product contained in the tank using a radiating antenna, such as a cone antenna or a patch antenna.

Furthermore, reference is mainly made to filling level determination by means of measuring the time between transmitted and reflected pulses. As is, however, evident to the person skilled in the relevant art, the teachings of the present invention are equally applicable to radar level gauge systems utilizing phase information for determining the filling level through, for example, frequency-modulated continuous wave (FMCW) measurements.

When pulses modulated on a carrier are used, phase information can also be utilized.

Figure 1A:
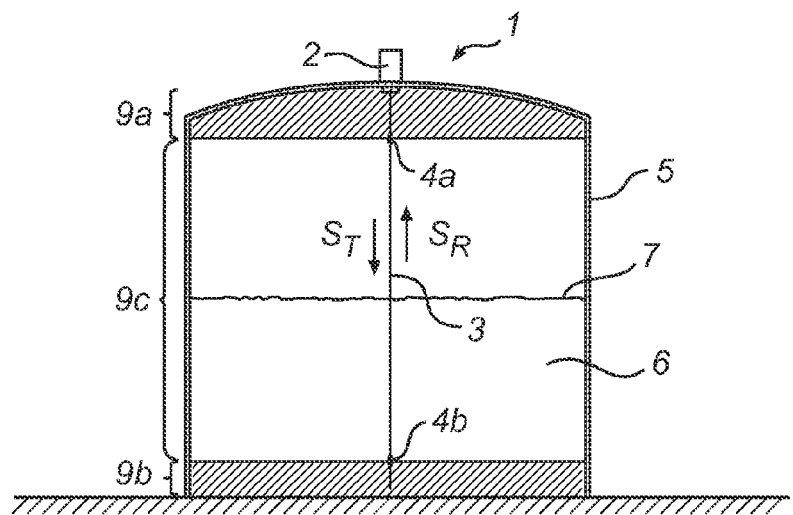
FIG. 1a schematically illustrates an operation monitoring device according to an embodiment of the present invention, in the form of a radar level gauge system installed in an exemplary tank.

FIG. 1a schematically illustrates an operation monitoring device according to an embodiment of the present invention, in the form of a radar level gauge system 1, comprising a measurement electronics unit 2, and a probe 3 having a two reference reflectors 4a-b attached thereto. The radar level gauge system 1 is provided on a tank 5, which is partly filled with a product 6 to be gauged.

The first 4a and second 4b reference reflectors function as reference propagation property discontinuities arranged at known levels $h_a$ and $h_b$, respectively, in the tank 5, and as will be discussed in more detail further below, each reference reflector 4a-b may comprise more than one reference propagation property discontinuity depending on the configuration of the reference reflector.

In FIG. 1a, the tank is schematically illustrated as comprising an overfill detection zone 9a close to the top of the tank 5, a depletion zone 9b close to the bottom of the tank 5, and a normal operation zone 9c between the overfill detection zone 9a and the depletion zone 9b. As is well known to those skilled in the art, the filling level range for normal operation may vary depending on the application, and may typically be around 10%-90% of the height of the tank 5. To enable the operator to vary the extension(s) of the overfill zone and/or the depletion zone, the first 4a and/or second 4b reference reflector may be arranged to be movable along the probe 3.

When a filling level is detected in the overfill detection zone 9a, a signal, such as an alarm signal, may be provided so that a potentially dangerous overfill situation can be prevented, and when a filling level in the depletion zone 9b is detected, it may be advantageous to provide a signal indicative thereof to enable prevention of a situation when the tank is depleted (sometimes referred to as a "dry run" situation). This latter situation may not be particularly harmful in a storage tank 5, such as that schematically depicted in FIG. 1a.

For tanks in the process industry, however, pumps and/or other equipment may be damaged if the tank is allowed to be depleted.

By analyzing the reflected signal $S_R$ traveling back from the surface 7, the measurement electronics unit 2 can determine if the first reference reflector 4a can be detected at or around its known level $h_a$, and provide a signal indicating whether or not the first reference reflector 4a can be detected within a predetermined distance from the known level $h_a$.

In addition, the measurement electronics unit 2 may determine if the second reference reflector 4b can be detected at its known level $h_b$ and provide a signal indicative thereof.

In the embodiment of the operation monitoring device 1 illustrated in FIG. 1a, it additionally functions as a radar level gauge system for determining the filling level of the product in the tank. Accordingly, the measurement electronics unit 2 also determines the distance between a reference position (such as the tank ceiling) and the surface 7 of the product 6, whereby the filling level can be deduced. It should be noted that, although a tank 5 containing a single product 6 is discussed herein, the distance to any material interface along the probe can be measured in a similar manner.

Figure 1B:
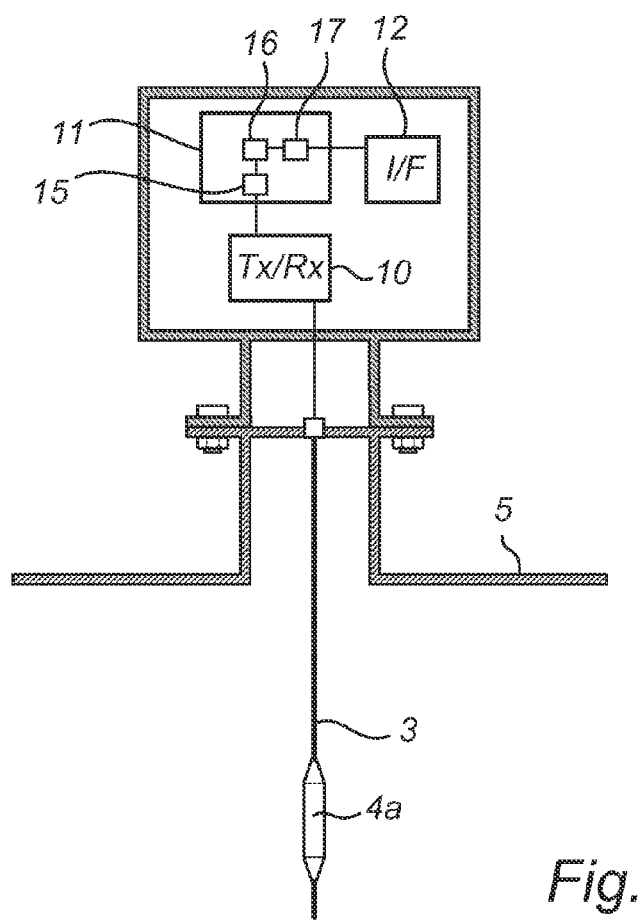

As is schematically illustrated in FIG. 1b, the electronics unit 2 comprises a transceiver 10 for transmitting and receiving electromagnetic signals, a processing unit 11, which is connected to the transceiver 10 for control of the transceiver and processing of signals received by the transceiver to monitor the reference reflector(s) 4a-b and to determine the filling level of the product 6 in the tank 5. The processing unit 11 is, furthermore, connectable to external communication lines 13 for analog and/or digital communication via an interface 12. Moreover, although not shown in FIG. 1b, the radar level gauge system 1 is typically connectable to an external power source, or may be powered through the external communication lines 13. Alternatively, the radar level gauge system 1 may be configured to communicate wirelessly.

The processing unit 11 in FIG. 1b comprises a signal evaluator 15, a determinator 16 and a signal generator 17. The signal evaluator 15 evaluates at least a portion of the reflected electromagnetic signal $S_R$, the determinator 16 determines if one or several propagation property discontinuities provided by the first 4a and/or second 4b reference reflectors is/are detectable at their expected positions along the probe 3, and the signal generator 17 provides a signal depending on the output from the determinator 16.

Figure 2A:
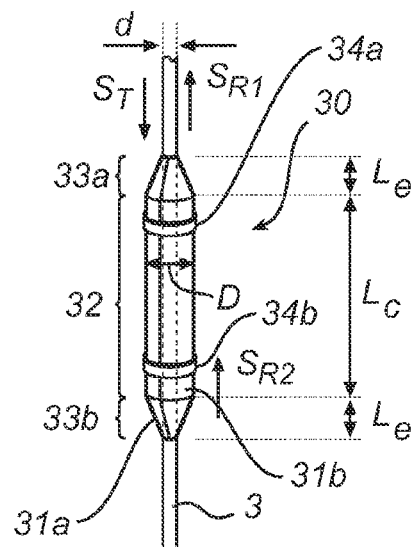
FIG. 2a schematically illustrates an exemplary reference reflector suitable for use in embodiments of the operation monitoring device according to the present invention.
Figure 2B:
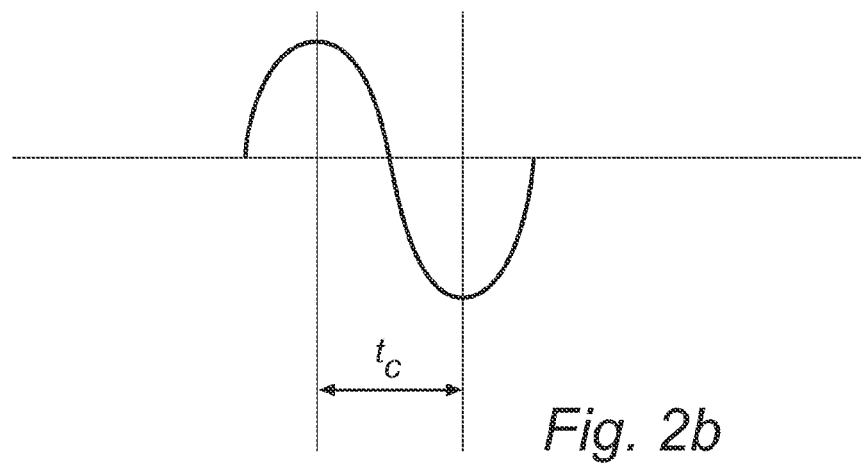

FIGS. 2a-b schematically show a first exemplary reference reflector and an echo signal resulting from reflection of the transmitted electromagnetic signal $S_T$ at this reference reflector.

In FIG. 2a, a reference reflector 30 is shown provided on a portion of the probe 3. According to the presently illustrated example, the reference reflector 30 is provided in the form of two halves 31a and 31b, which are clamped to the probe 3 by means of two clamps 34a-b. The reference reflector 30 has an essentially cylindrical portion 32 with a length $L_c$, and first and second essentially frustoconically shaped ends 33a-b that smoothly slope towards the probe 3 and each extends a length $L_e$.

Through the provision of the reference reflector 30 in FIG. 2a, the probe 3 becomes locally thicker and thus locally exhibits a lower impedance. Electromagnetic signals $S_T$ traveling down along the probe 3 will therefore be partly reflected first at the top of the reference reflector 30, which represents a first propagation property discontinuity, and then at the bottom of the reference reflector, which represents a second propagation property discontinuity. The reflection at the top of the reference reflector is the result of reflection at a transition to a lower impedance, and the resulting reflected signal $S_{R1}$ will therefore have the same sign as the incoming signal $S_T$. Analogously, the reflection at the bottom of the reference reflector will result in a reflected signal $S_{R2}$ will having opposite sign/polarity to the incoming signal $S_T$.

The purpose of the sloping ends 33a-b of the reference reflector 30 in FIG. 2a is to avoid ledges on which product 6 in the tank 5 can accumulate and disturb the measurement. Furthermore, the length of each sloping end 33a-b of the reference reflector 30 should be considerably shorter than a pulse length for a pulsed system. For example, in the case of a 1 ns pulse, the pulse length is about 150 mm, and the length $L_e$ of each sloping end 33a-b should be less than about 20 mm. It should be noted that the sloping ends 33a-b may have mutually different lengths and/or shapes.

The diameter of the reference reflector 30 in FIG. 2a is selected such that about 1% of the power of an incoming signal $S_T$ is reflected at each end of the reference reflector.

Moreover, the length $L_c$ of the central portion of the reference reflector 30 is advantageously selected such that the top and bottom reflected signals $S_{R1}$ and $S_{R2}$ combine to form an easily distinguishable wave form.

Exemplary dimensions for the reference reflector 30 in FIG. 2a in order to achieve a suitable reference reflector signal and at the same time reduce the risk of excessive probe contamination, are provided below and ideally result in the waveform schematically shown in FIG. 2b.

Pulsed system–pulse length $t_p$: 1 ns
Probe diameter d: 6 mm
Reference reflector diameter D: 20 mm
Length of cylindrical portion $L_c$: 100-150 mm
Length of sloping portions: $L_e$<20 mm These parameters would typically result in a reflection coefficient of about 0.08 (a 1 mm layer of PTFE would give a reflection coefficient of about 0.14) due to the change of impedance along the probe. Hereby, excessive attenuation of the electromagnetic signals transmitted along the probe 3 is avoided, while at the same time achieving distinguishable signals resulting from reflections at the reference reflectors.

As discussed above, there will be two reflections $S_{R1}$ and $S_{R2}$ which are separated in time and of opposite polarity. By matching the time $t_c$ between the reflected signals $S_{R1}$ and $S_{R2}$ with the pulse length $t_p$, an incoming half period will be reflected as an easily distinguishable full period.

In the exemplary case represented by the parameters given above, the length $L_c$ of the cylindrical portion 32 may, for example, be selected to about 100 mm to yield a full-period curve form, is indicated in FIG. 2b, for the composite reflected signal $S_{R1}+S_{R2}$ for a submerged reference reflector 30 ($t_p$=1 ns corresponds to about 100 mm in a liquid that is transparent for microwave radiation. Alternatively, the length $L_c$ can be selected to about 150 mm to yield a full-period curve form for an unsubmerged reference reflector 30. Obviously, other lengths $L_c$ can be selected for achieving an easily distinguishable composite reflected signal.

In the above, the design of a reference reflector 30 for a pulsed guided wave radar GWR system has been exemplified, in which the length $L_c$ of the reference reflector 30 is related to the pulse length $t_p$ in such a way that an easily distinguishable reflected signal is achieved. For FMCW (Frequency Modulated Continuous Wave) type GWR systems, the length $L_c$ of the reference reflector 30 should instead be related to the center frequency of the frequency sweep characteristic to FMCW-type systems. In particular, the length $L_c$ of the reference reflector 30 should correspond to a quarter of the wavelength at the center frequency of the transmitted signal.

For FMCW-type systems, the wavelength of the transmitted signal in the product (in the case of a transparent product) is the most relevant, since a submerged reference reflector 30 can be made practically invisible by properly selecting the dimensions thereof. As an alternative to adapting the length $L_c$ of the reference reflector 30 to achieve the desired invisibility when submerged, the reference reflector can be provided as two separate reflectors that are located a quarter of a wavelength (at the center frequency of the FMCW frequency sweep) apart along the probe.

Figure 3:
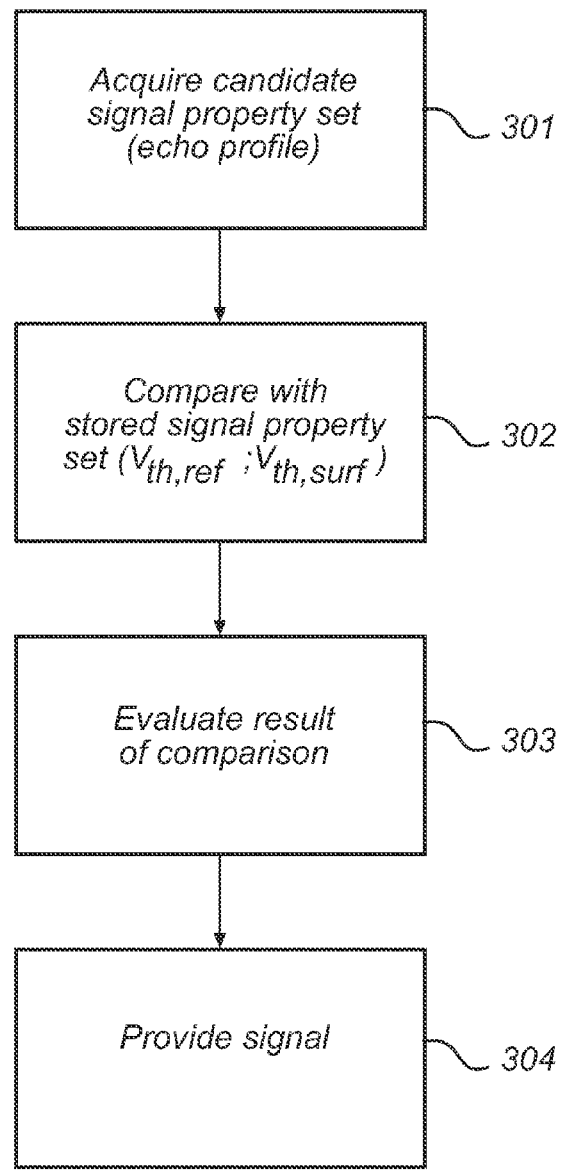
FIG. 3 is a flow-chart schematically illustrating an embodiment of the method according to the present invention.

A method for overfill detection including proof testing according to an embodiment of the present invention will now be described with reference to the flow-chart in FIG. 3.

In a first step 301, a candidate signal property set is acquired based at least on portions of the reflected electromagnetic signal $S_R$ corresponding to the known level $h_a$ of a first propagation property discontinuity provided by the first 4a reference reflector.

Such a candidate signal property set may, for example, include one or several of a peak voltage, a pulse duration, a pulse shape etc.

Subsequently, in step 302, the acquired signal property set, for example an echo profile in the case of a pulsed GWR-system, is compared to a stored signal property set indicative of the first propagation property discontinuity.

The stored signal property set may, for example, be a threshold amplitude, in which case the echo profile determined based on the reflected electromagnetic signal $S_R$ can be compared with such a threshold amplitude.

In the next step 303, the result of the comparison performed in step 302 is evaluated to detect the first propagation property discontinuity provided by the reference reflector 4a, and a signal indicative of the evaluation result is provided in step 304.

Based on the signal indicative of the evaluation result provided in step 304, conclusions can be drawn concerning the operational status of the tank and the radar level gauge system installed at the tank to determine the filling level thereof.

In addition, the operation monitoring system may further determine the filling level of the product contained in the tank, which allows for more information to be extracted concerning the operational status of the system.

This will now be elucidated further with reference to FIGS. 4a-c that schematically illustrate three exemplary operational cases with different filling level conditions.

In FIG. 4a, a case is illustrated in which the filling level 7 of the tank 5 is in the normal operation zone 9c. As can be seen in the diagram in FIG. 4a, an echo profile 30 is acquired which has a number of distinct echoes. In particular, the echo profile 30 shown in FIG. 4a has first 31 and second 32 strong negative echoes. The first negative echo 31 results from reflection of the transmitted signal $S_T$ in FIG. 1a at the interface between the measurement electronics unit 2 and the probe 3, and the second negative echo 32 results from reflection at the end of the probe 3. The echo profile 30 in FIG. 4a further comprises a (positive) surface echo 36 resulting from reflection of the transmitted signals $S_T$ at the surface 7 of the product 6 in the tank 5, and two additional echoes 37, 38 resulting from reflection of the transmitted signals $S_T$ at the first 4a and second 4b reference reflectors, respectively. It should be noted that each of the echoes 37, 38 of the reference reflectors 4a-b is a composite echo comprising a positive portion and a negative portion, as was described above in connection with FIGS. 2a-b.

Based on an evaluation of the echo profile 30 in FIG. 4a, the possible presence of the reference reflectors 4a-b at their known levels $h_a$, $h_b$ can be detected, and the filling level 7 can be determined. One exemplary way of evaluating the echo profile is to use a positive threshold voltage $V_{th,surf}$ for determining which echo should be assigned to be the surface echo 36, and a negative threshold voltage $V_{th,ref}$ for determining which echoes should be assigned to be the echoes 37, 38 from the reference reflectors 4a-b.

As will be known to those skilled in the art, several other criteria for assigning echoes in an echo profile to the surface and/or to reference structures are conceivable.

In the diagram in FIG. 4a, the known levels $h_a$, $h_b$ of the first and second propagation property discontinuities, respectively, are indicated, and, as can be seen in FIG. 4a, the first reference reflector 4a is detected at its known level $h_a$, and the second reflector 4b cannot be detected at its known level $h_b$, due to the difference in propagation velocity between the product 6 and the atmosphere in the tank 5 above the product. Moreover, the level of the surface 7 (the filling level) can be detected at a level $h_s$ located below the level $h_a$ of the first reference reflector 4a (and above the level $h_b$ of the second reference reflector 4b).

From this set of observations:
the first reference reflector 4a is detected at its known level $h_a$;
the second reference reflector 4b cannot be detected at its known level $h_b$ (but at a measured level being seemingly lower than the known level $h_b$); and
the surface 7 can be identified at a level below the known level of the first reference reflector 4a, it can (at least) be deduced that the tank is a normal operation mode, and the operation monitoring device 1 works as intended. This set of observations can be used as a proof test for the operation monitoring device 1, and may be run periodically or irregularly. According to one embodiment, this combined status check and proof test can advantageously be performed continuously, such as with a measurement frequency of around 1 Hz (one measurement sweep per second).

Turning now to FIG. 4b, a case is illustrated where the surface level 7 (filling level) is within the overfill detection zone 9a. In the echo profile 40 acquired in this case, the first reference reflector 4a cannot be detected at its known level $h_a$, the surface echo 36 indicates a level $h_s$ above the known level $h_a$ of the first reference reflector 4a, and, again, the second reflector 4b cannot be detected at its known level $h_b$.

In this case, it can be determined that the surface 7 is in the overfill detection zone 9a, and the surface level can be output.

It is not always the case that the surface level can be identified by the operation monitoring device 1. For example, there may be difficult surface conditions in the tank 5, such as turbulence due to filling of the tank etc. In such a situation, the operation monitoring device 1 may either be able or unable to detect the first reference reflector 4a at its known level $h_a$.

If the first reference reflector 4a can be detected at its known level $h_a$, it can be deduced that the operation monitoring device 1 is functional and that the surface 7 is not in the overfill detection zone 9a. Therefore, operation of the tank 5 may be allowed to be continued.

If the first reference reflector 4a cannot be detected at its known level ha, it can be deduced that the surface 7 is either at or above the known level $h_a$ of the first reference reflector 4a.

Finally, in FIG. 4c, a case is illustrated where the surface level 7 (filling level) is within the depletion zone 9b at the bottom of the tank 5. In the echo profile 50 acquired in this case, both the first reference reflector 4a and the second reference reflector 4b are detected at their respective known levels $h_a$, $h_b$, which means that the surface 7 must be located below the second reference reflector 4b (as is also indicated in FIG. 4c).

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A method of monitoring operation of a radar level gauge system installed at a tank and arranged to determine a filling level of a product contained in the tank, comprising the steps of:
    providing a first propagation property discontinuity at a first level in the tank, said first level defining an overfill detection zone above a normal filling level range for the tank;
    generating and transmitting an electromagnetic signal;
    allowing said transmitted electromagnetic signal to propagate towards and into said product contained in the tank;
    receiving a reflected electromagnetic signal including a first reference echo resulting from reflection at said first propagation property discontinuity and a surface echo resulting from reflection at a surface of said product contained in the tank;
    determining, based on the reflected electromagnetic signal, if said first reference echo is detectable at said first level;
    determining, based on the reflected electromagnetic signal, if said surface echo is detectable;
    in response to said surface echo being detectable, providing a fill level output indicative of said filling level; and
    in response to said surface echo being non-detectable and said first reference being detectable at said first level, deducing that the monitoring device is functional, and continuing operation of the tank, and
    in response to said surface echo being non-detectable and said first reference being non-detectable at said first level,
    providing an overfill condition output.

2. The method according to claim 1, wherein said steps of determining comprise the steps of:
    acquiring a candidate signal property set based on said first portion of the reflected electromagnetic signal; and
    comparing said candidate signal property set with a stored signal property set indicative of said first reference echo.

3. The method according to claim 1, further comprising the steps of:
    providing a second propagation property discontinuity at a known distance from said first propagation property discontinuity and closer to the bottom of the tank than said first propagation property discontinuity;
    determining an electrical distance between the first propagation property discontinuity and the second propagation property discontinuity based on said reflected electromagnetic signal; and
    determining a vapor compensated time-of-flight corresponding to said first distance from the reference position at the top of the tank based on said known distance and said electrical distance,
    wherein a vapor compensated portion of the reflected electromagnetic signal exhibiting said vapor compensated time-of-flight is evaluated.

4. The method according to claim 1, further comprising providing a probe extending into the product contained in the tank, and providing said first propagation property discontinuity along said probe.

5. An operation monitoring device for monitoring operation of a radar level gauge system installed at a tank and arranged to determine a filling level of a product contained in the tank, the operation monitoring device comprising:
    a transceiver which generates, transmits and receives electromagnetic signals;
    a propagation device connected to said transceiver and arranged to guide a transmitted electromagnetic signal from said transceiver towards and into said product inside the tank, and to return a reflected electromagnetic signal including a surface echo resulting from reflection at a surface of said product contained in the tank;
    at least a first propagation property discontinuity being arranged at a first level in the tank, said first level defining an overfill detection zone above a normal filling level range for the tank;
    a signal evaluator which determines, based on the reflected electromagnetic signal, if said surface echo is detectable, and if a first reference echo from said first propagation discontinuity is detectable at said first level; and
    a signal generator which:
        in response to said surface echo being detectable, provides a fill level output inductive of said filling level; and
        in response to said surface echo being non-detectable and said first reference being detectable at said first level, deduces that the monitoring device is functional and continuing operation of the tank, and
        in response to said surface echo being non-detectable and said first reference being non-detectable at said first level, provides an overfill condition output in response to said surface echo being non-detectable and said first reference echo being non-detectable at said first level.

6. The operation monitoring device according to claim 5, wherein said signal evaluator comprises:
    an acquisition unit for acquiring a candidate signal property set based on a first portion of the reflected electromagnetic signal; and
    a comparator for comparing said candidate signal property set with a stored signal property set indicative of said first reference echo.

7. The operation monitoring device according to claim 5, wherein said first propagation property discontinuity is provided by a movable reference reflector.

8. The device according to claim 5, wherein said signal generator further provides an output indicating said filling level is below said first propagation property discontinuity in response to said surface echo being non-detectable and said first reference echo being detectable at said first level.

9. The device according to claim 5, wherein said propagation device is a probe extending into the product contained in the tank, and wherein said first propagation property discontinuity is provided along said probe.

10. A method of monitoring level a product in a tank using a radar level gauge system, comprising:
    placing a first propagation discontinuity at a first level in the tank;
    transmitting an electromagnetic signal into the tank;
    receiving an echo profile from the tank based upon the transmitted electromagnetic signal;
    identifying normal operation of the tank and providing a proof test if the echo profile includes a first echo reflected from the first propagation discontinuity which first echo is detectable at the first level and a surface echo reflected from a surface of the product and wherein the surface is located below the first propagation discontinuity;

identifying an overfill condition if the echo profile does not include the first echo reflected from the first propagation discontinuity which first echo is detectable at the first level and does include the surface echo reflected from the surface of the product and wherein the surface is located above the first level;

identifying that the radar level gauge system is functional and the product is not in an overfill condition if the echo profile does include the first echo reflected from the first propagation discontinuity which first echo is detectable at the first level and does not include the surface echo reflected from the surface of the product; and identifying a surface level at or above the first level if the echo profile does not include the first echo reflected from the first propagation discontinuity which first echo is detectable at the first level and does not include the surface echo reflected from the surface of the product, and providing a fill level output based on said surface echo when normal operation is identified.

11. The method according to claim 10, wherein said steps of identifying comprise the steps of:

acquiring a candidate signal property set based on a first portion of the reflected electromagnetic signal; and comparing said candidate signal property set with a stored signal property set.

12. The method according to claim 10, further comprising the steps of:

providing a second propagation property discontinuity at a known distance from said first propagation property discontinuity and closer to the a bottom of the tank than said first propagation property discontinuity;

determining an electrical distance between the first propagation property discontinuity and the second propagation property discontinuity based on said echo profile; and determining a vapor compensated time-of-flight corresponding to said first distance from the reference position at a top of the tank based on said known distance and said electrical distance, wherein a vapor compensated portion of the echo profile exhibiting said vapor compensated time-of-flight is evaluated.

13. The method according to claim 10, further comprising providing a probe extending into the product contained in the tank, and providing said first propagation property discontinuity along said probe.

* * * * *